United States Patent [19]
Bruner

[11] Patent Number: 5,349,614
[45] Date of Patent: Sep. 20, 1994

[54] STEAM LINE PLUG INSTALLATION TOOL

[75] Inventor: James E. Bruner, Downington, Pa.

[73] Assignee: General Electric Company, San Jose, Calif.

[21] Appl. No.: 34,976

[22] Filed: Mar. 22, 1993

[51] Int. Cl.$^5$ ............................................. G21C 13/00
[52] U.S. Cl. .................................... 376/204; 376/260
[58] Field of Search ......................... 376/204, 203, 260

[56] References Cited

U.S. PATENT DOCUMENTS 3,920,512  11/1975  Sutherland .......................... 376/204
4,548,783  10/1985  Dalke et al. ........................ 376/204

Primary Examiner—Donald P. Walsh
Assistant Examiner—Frederick H. Voss
Attorney, Agent, or Firm—J. S. Beulick

[57] ABSTRACT

A tool for remotely installing a plug in a steam line of a reactor vessel. The tool has a strongback assembly on which a plug is securely mounted, a collapsible structure (e.g., a scissors jack assembly) which supports the strongback assembly and is movable between an extended state and a collapsed state, a hanging bracket assembly for hanging the collapsible structure inside the reactor vessel, and a rotatable actuating screw coupled to the collapsible structure. The collapsible structure moves between the extended and collapsed states in response to rotation of the actuating screw. During this operation, the plug is carried from a retracted position outside and aligned with the steam line nozzle to an inserted position inside the nozzle.

20 Claims, 7 Drawing Sheets

STEAM LINE PLUG INSTALLATION TOOL

FIELD OF THE INVENTION

This invention generally relates to an apparatus for installing a plug in a line which communicates with a vessel. In particular, the invention is directed to an apparatus for installing a plug in the steam outlet nozzle of a boiling water reactor ("BWR").

BACKGROUND OF THE INVENTION

During disassembly of a BWR, the steam outlet nozzles must be plugged to allow maintenance and testing of the main steam isolation valves in parallel with reactor refueling and servicing operations. The steam line plugs are used to seal the steam lines to prevent the flow of water from the reactor cavity during servicing of the safety valves, relief valves and main steam isolation valves.

Historically, plug installation has been performed using an overhead crane and service poles manipulated by hand. This conventional operation is attended by problems. First, this current method of installing the plugs requires that personnel be located in the reactor cavity to position and maneuver the steam line plugs as they are being lowered by the overhead crane. Second, the current method of installing the plug requires that personnel push the plug into the steam outlet nozzle from the opposite side of the reactor vessel using a pole. Third, the steam line plug installation envelope should allow for unobstructed removal of the steam separator. Conventional installation tools interfere with or obstruct the removal of the separator and must be disengaged from the plug and removed after the plug has been installed.

SUMMARY OF THE INVENTION

The invention is a steam line plug installation tool which overcomes the foregoing disadvantages of the conventional apparatus.

Using the installation tool of the invention, the steam line plug can be installed underwater by personnel standing on the refueling bridge. The tool inserts the steam line plug into the steam outlet nozzle using a scissors jack mechanism actuated by a lead screw operated using a grapple and a service pole.

The installation tool is designed to position the plug at the proper elevation and azimuth using the reactor vessel flange and head closure stud as references. No personnel are required at the vessel flange to position the tool, thereby reducing the exposure of personnel to radiation.

In addition, the plug installation tool envelope is such that the tool can remain in place after installation of the plug and still allow removal of the steam dryer and separator to their underwater storage pool.

The steam line plug installation tool in accordance with the preferred embodiment of the invention comprises a strongback assembly on which the plug is securely mounted, a collapsible structure (e.g., a scissors jack assembly) which supports the strongback assembly and is movable between an extended state and a collapsed state, a hanging bracket assembly for hanging the collapsible structure inside the vessel, and a rotatable actuating screw coupled to the collapsible structure such that the latter moves between the extended and collapsed states in response to rotation of the actuating screw. During this operation, the plug is carried from a position outside and aligned with the vessel orifice to be plugged to a position inside the orifice.

In accordance with the preferred embodiment, the plug installation tool further comprises a mechanism for adjusting the elevation of the collapsible structure relative to the hanging bracket assembly and a mechanism for adjusting the elevation of the strongback assembly to the collapsible structure. The latter mechanism is operated via a rotatable actuating screw. Both actuating screws are turned remotely using a conventional service pole. The plug installation tool also includes a guide plate which cooperates with the reactor head studs to place the tool at an azimuth corresponding to the azimuth of the orifice to be plugged.

The tool is installed using a grapple which couples to a rotatable handling bracket assembly. The handling bracket is locked in a first angular position by a releasable pawl. After the plug has been installed in the orifice, the pawl is released remotely using a service pole. The handling bracket is then rotated to a position at which removal of the steam separator assembly from the reactor vessel will not be obstructed.

DETAILED DESCRIPTION OF THE PREFERRED EMBODIMENTS

Figure 1:
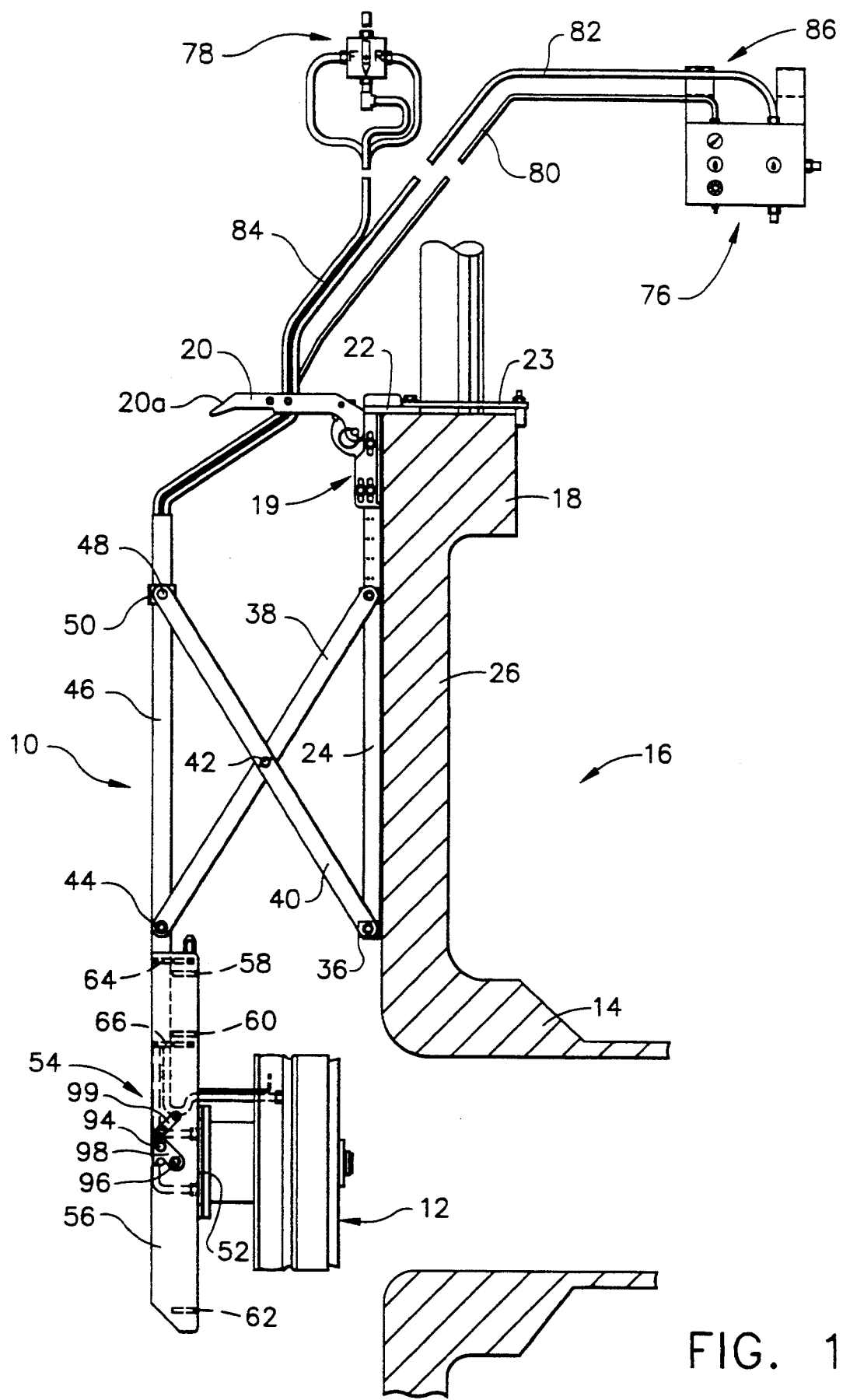
FIGS. 1 and 4 are side views of the steam line plug installation tool in accordance with a preferred embodiment of the invention when the tool is in the retracted and inserted positions respectively.
Figure 4:
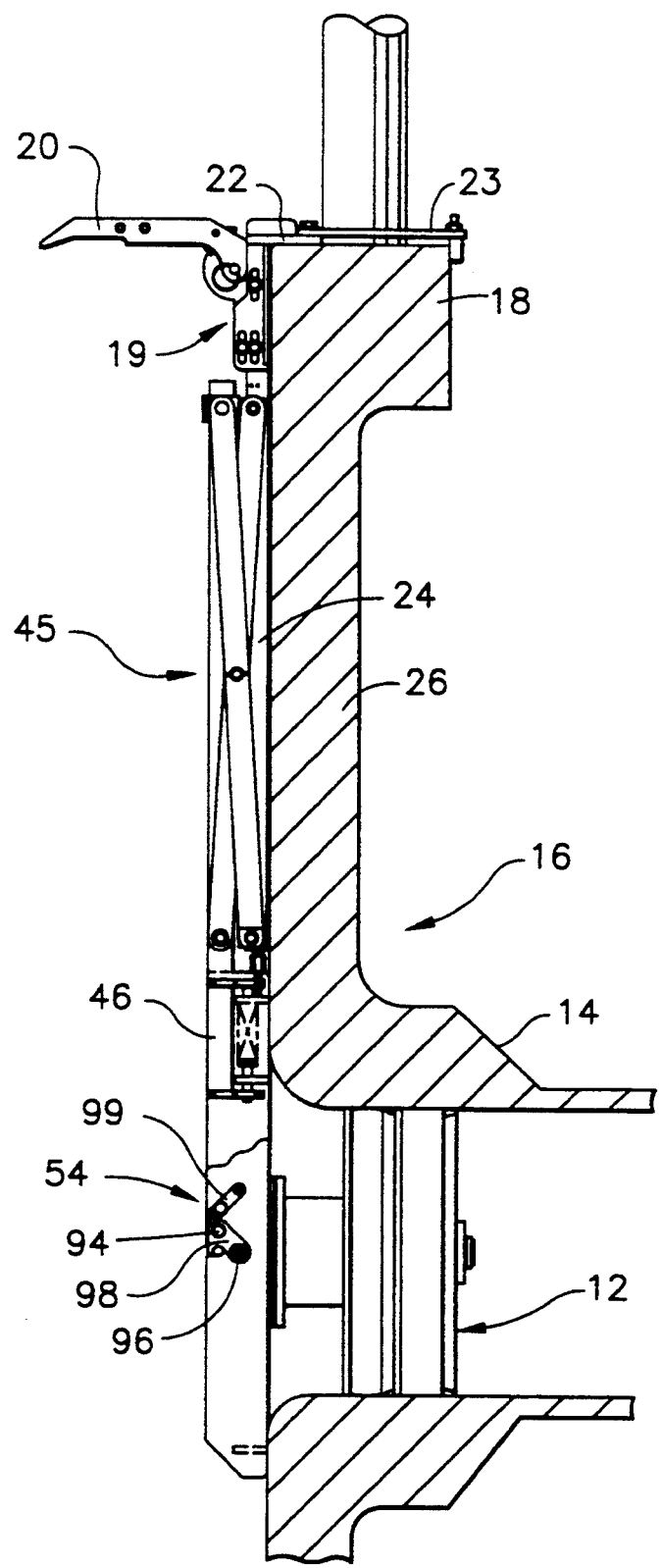

Referring to FIGS. 1 and 4, the steam line plug installation tool 10 in accordance with the preferred embodiment of the invention can be used to insert a plug 12 with inflatable seal in the steam outlet nozzle 14 of the pressure vessel 16 of a BWR. The tool 10 is hung on the reactor vessel flange 18 using handling bracket 20. Handling bracket 20 is maintained in a horizontal position by holding pawl 21. Upon release of holding pawl 21, handling bracket 20 can be rotated downward by 90° and out of the way of the steam separator assembly during the latter's removal.

The plug installation tool is hung by seating hanger bracket 19 on top of vessel flange 18. In this position, the vessel supports the tool with actuating channel 24 of the latter bearing against the vessel wall 26. A guide plate 23 is bolted to a hanger plate 22 of hanger bracket 19. The tool is hooked onto reactor vessel flange 18 via hook 23a of guide plate 23.

Figure 5:
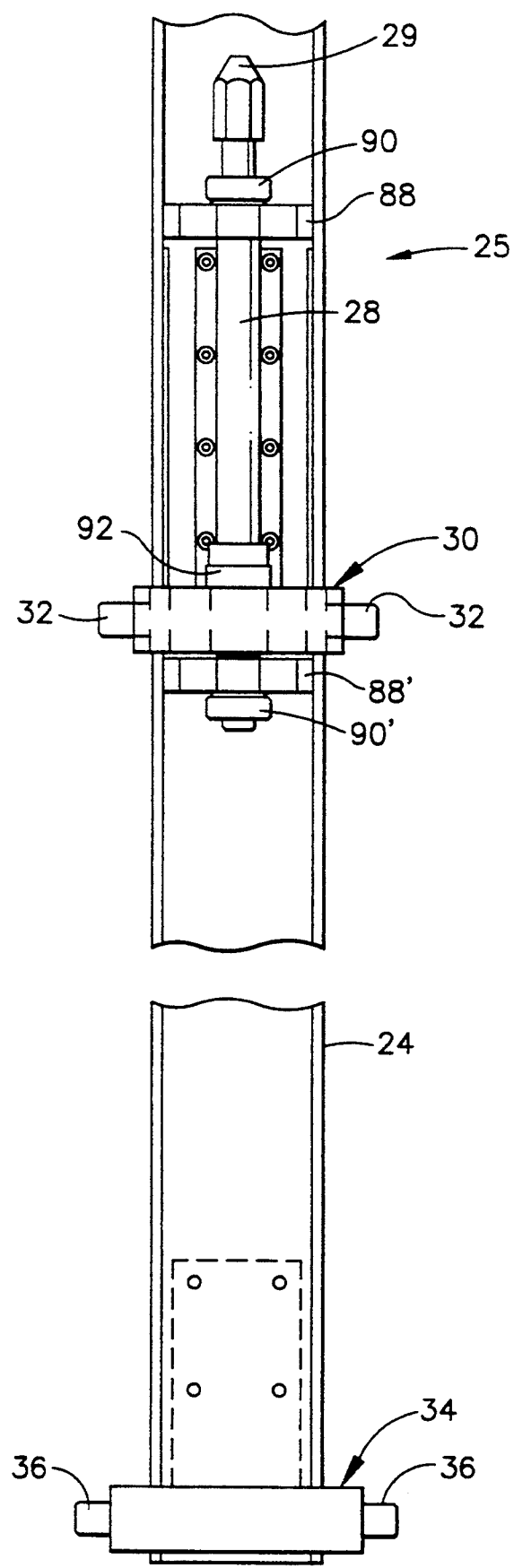
FIGS. 5 and 6 are rear views of the actuating screw assembly and the strongback assembly respectively accordance with the preferred embodiment of the invention.

An actuating screw assembly 25 (see FIG. 5) is mounted inside actuating channel 24. This assembly comprises an actuating screw 28 (with hexagonal head which is supported at respective ends by upper and lower support blocks 88 and 88' welded to actuating channel 24. Actuating screw rotates freely without vertically displacing relative to support blocks 88, 88'. Vertical displacement of actuating screw 28 is blocked by collars 90, 90' secured thereto. Actuating screw 28 is threadably coupled to bronze acme nut 92, which is in turn secured to carriage block 30 having axle shafts 32 at respective ends thereof. Carriage block 30 rides in a pair of parallel vertical slots (not shown) formed in actuating channel 24 in response to rotation of actuating screw 28. A fixed lower axle mount 34, having axle shafts 36 at respective ends thereof, is also mounted in the bottom end of actuating channel 24.

The ends of a pair of inside scissors bars 38 are pivotably coupled to respective axle shafts 32. Similarly, the ends of a pair of outside scissors bars 40 are pivotably coupled to respective axle shafts 36. Each inside scissors bar 38 is pivotably coupled to the corresponding outside scissors bar 40 by way of a pivot pin 42. The other ends of inside scissors bars 38 are pivotably coupled to pivot pins 44 which are mounted in and extend from a plug support tube 46. Plug support tube 46 is substantially parallel to actuating channel 24. The other ends of outside scissors bars 40 are pivotably coupled to pivot pins 48 which are mounted in and extend from a scissors slide collar 50 which is slidable along plug support tube 46. This arrangement of pivot pins, axle shafts and scissors bars constitutes the scissors jack assembly 45 for linearly displacing plug support tube 46 toward and away from actuating channel 24.

In response to rotation of actuating screw 28 when the tool is in the state shown in FIG. 1, the carriage block 30 and the ends of inside scissors bars 38 connected thereto are vertically displaced. Scissors slide collar 50 is simultaneously vertically displaced. As a result, the scissors jack assembly 45 collapses into the state shown in FIG. 4.

Figure 6:
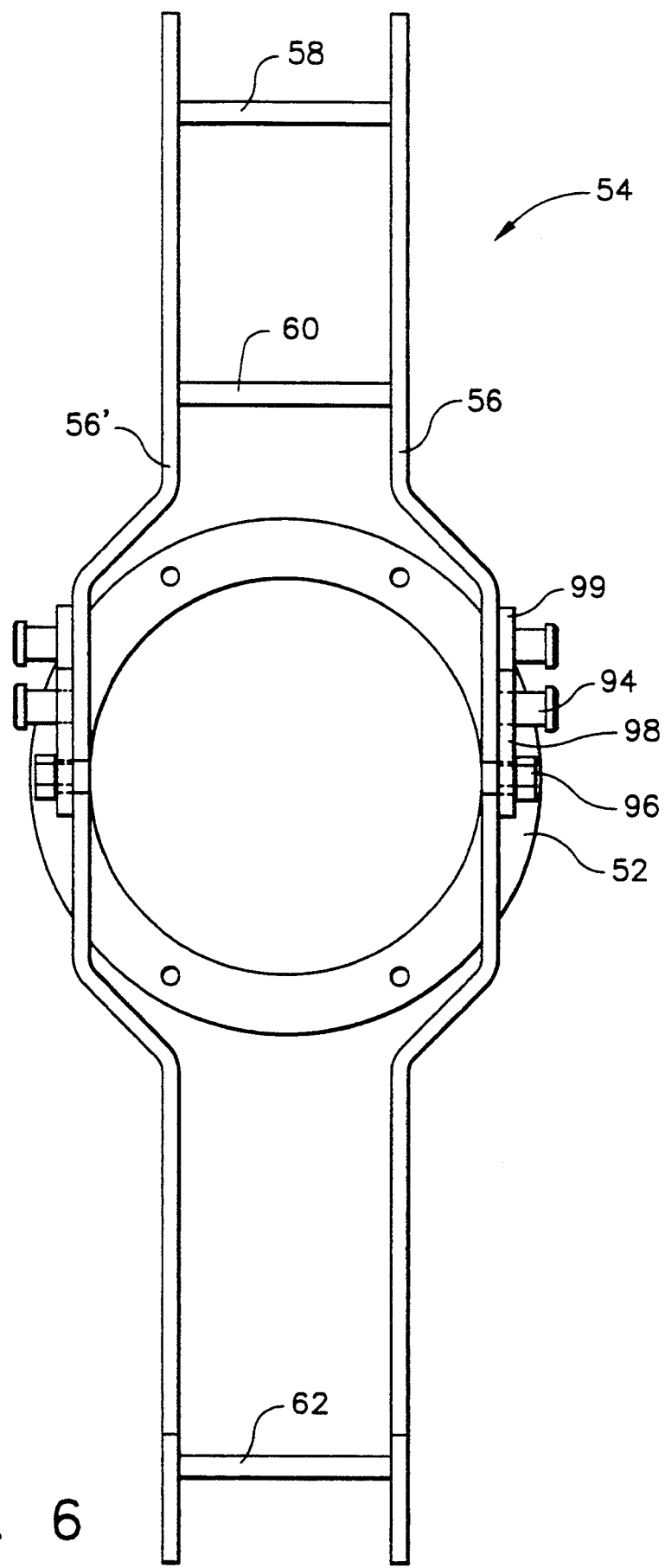

The plug 12 with inflatable seal is attached to a plug mounting ring 52, which is shown in detail in FIG. 6. Plug mounting ring 52 is connected to right and left strongback bars 56 and 56' of strongback assembly 54. Strongback bars 56 and 56' are rigidly connected by upper slide bar 58, lower slide bar 60 and cross bar 62. Strongback assembly 54 is adjustably supported by upper and lower slide support plates 64 and 66 respectively welded to the plug support tube 46.

Figure 3:
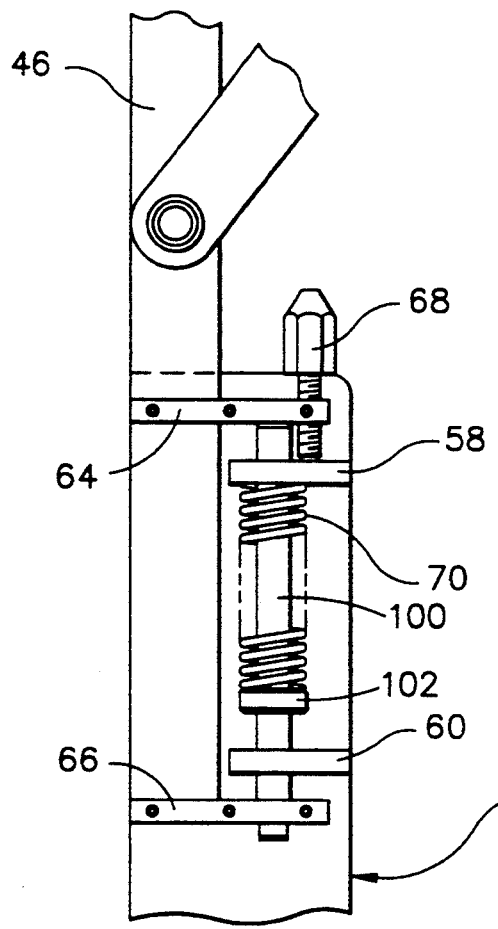

As best seen in FIG. 3, the elevation of strongback assembly 54—and consequently, the elevation of plug 12—relative to plug support tube 46 can be finely adjusted by turning adjustment screw 68. The threaded portion of adjustment screw 68 is screwed into a threaded bore in upper slide support plate 64, while the end of adjustment screw 68 bears against upper slide bar 58. Strongback assembly 54 is lowered relative to plug support tube 46 when adjustment screw 68 is rotated clockwise, thereby overcoming the resistance of a heavy-duty compression spring 70. When adjustment screw 68 is rotated in the opposite direction, compression spring 70 urges strongback assembly 54 upward relative to plug support tube 46. The compression spring 70 is supported by collar 102 securely mounted on slide shaft 100, on which upper and lower slide bars 58 and 60 slide. Slide shaft 100 is in turn supported by threads in upper slide support plate 64 and securely pinned to lower slide support plate 66. Slide shaft 100 slides in bushings (not shown) respectively seated in upper and lower slide bars 58 and 60.

The fine adjustment of the elevation of strongback assembly 54 relative to plug support 46 is added to the coarse adjustment of the elevation of plug support tube 46 relative to the reactor flange. The elevation of plug support tube 46 is adjusted by sliding actuating channel 24 relative to hanger bracket 19 and then tightening six mounting screws 73 when actuating channel 24 is at the desired position (see FIG. 2). The midportions of mounting screws 73 slide in slotted mounting holes 74 formed in hanger bracket 19 and the ends of screws 73 are screwed into threaded bores (not shown) in actuating channel 24. Coarse adjustment is accomplished prior to installation by positioning the hanger bracket 19 with respect to the plug centerline using the six slotted mounting holes 74.

The inflatable seal (not shown) of plug 12 is remotely inflated after plug installation by manipulating a control console 76 and setting a four-way valve 78 to expand mechanical grips (not shown). An air supply line 80 and a vent line 82 connect control console 76 to the inflatable seal. Three motor actuating lines 84 connect four-way valve 78 to an actuating air impact motor 103 (see FIGS. 7A and 7B), which is coupled to the inflatable seal for expanding the mechanical grips of the seal against the walls of nozzle 14. Lines 80, 82 and 84 pass through the channel of the plug support tube 46.

The installation and operation of the plug assembly of the invention are as follows:

The plug assembly is staged upright in a staging stand for transfer to the jet pump grapple on the refueling bridge- As an alternative, the plug can be located in a fixture mounted off the wall of the reactor cavity, thus eliminating the need to transfer to the jet pump grapple using the overhead crane.

The control console 76 and four-way valve 78 are located on the reactor cavity handrails 86 at the azimuth of the steam line for plug installation. The air supply and actuating lines are unrolled and staged for hookup to the installation tool.

Figure 2:
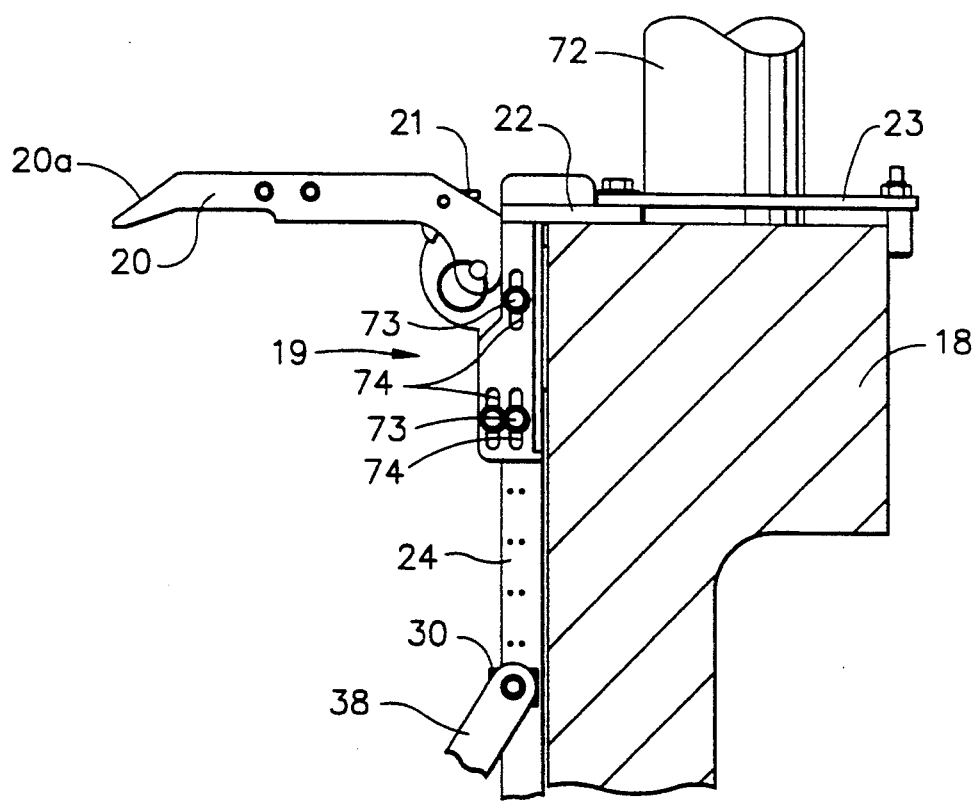
FIGS. 2 and 3 are side views showing the gross and fine elevation adjustment mechanisms respectively in accordance with the preferred embodiment of the invention.

The jet pump grapple (not shown) on the monorail hoist is hooked up to the installation tool handling bracket 20. The handling bracket is temporarily maintained in the horizontal position using a pawl 21 as shown in FIG. 2. This feature facilitates the hookup and removal of the grapple.

With the steam line plug assembly hanging from the monorail hoist, the assembly is lowered until the air lines can be attached to the quick disconnects. A safety tag line is also hooked up to an eye bolt on the hanger bracket.

The plug assembly is then lowered into the reactor cavity and positioned on the reactor vessel flange 18 at the azimuth of the steam line nozzle. Guide plate 23, which is bolted to hanger plate 22, hooks over the reactor vessel flange 18 and positions the plug 12 at the correct azimuth using the reactor head studs 72 as a reference.

The jet pump grapple is released from the handling bracket 20. An actuating service pole (not shown) with a 1-inch socket adapter is then lowered and mated to the hexagonal head 29 of actuating screw 28 (see FIG. The service pole is turned clockwise, causing the actuating screw carriage 30 to collapse the scissors jack assembly 45, thereby inserting plug 12 into nozzle 14. An underwater TV camera (not shown) can be used to monitor the insertion and verify position. If the elevation needs to be further adjusted, the fine elevation adjustment screw 68 (see FIG. 3) can be turned to raise or lower the plug ±⅜ inch as necessary. To accomplish this, the service pole is removed from actuating screw 28 and mated to the hexagonal head of fine elevation adjustment screw 68. Using the underwater camera to monitor the plug, adjusting screw 68 is turned as necessary to lower or raise the plug. Pre-loaded compression spring 70 will raise the plug if necessary to increase its elevation. If the plug elevation is too high, compression spring 70 will compress as necessary.

Once the plug is inserted, the service pole is used to tap the arm of pawl 21 to release the handling bracket 20. Handling bracket 20 will fold down over the back of the scissors slide collar 50 and plug support tube 46. The handling bracket provides a tapered guide surface 20a to prevent snagging during installation and removal of the steam separator from the reactor vessel.

Thereafter, the air lines are hooked up to the quick disconnects on the four-way valve 78 and control console 76. A 90-psig air supply is hooked up to four-way valve 78 and a 150-psig air supply is hooked up to a ¼-inch NPT connection on control console 76. Then the operating lever on the four-way valve is turned to the (I) position and hold for 40 sec to engage the holding grips (not shown) of the steam line plug 12. Binoculars or the underwater camera can be used to verify that the plug has engaged the proper amount of travel by observing that a position indicator rod (not shown) is positioned in the full travel range.

After the plug is in the proper position, the pneumatic seal is inflated to actuate the plug secondary seal. The absence of air leaks should be verified by visually observing whether any bubbles are rising from the plug. This completes the plug installation operation.

Figure 7A:
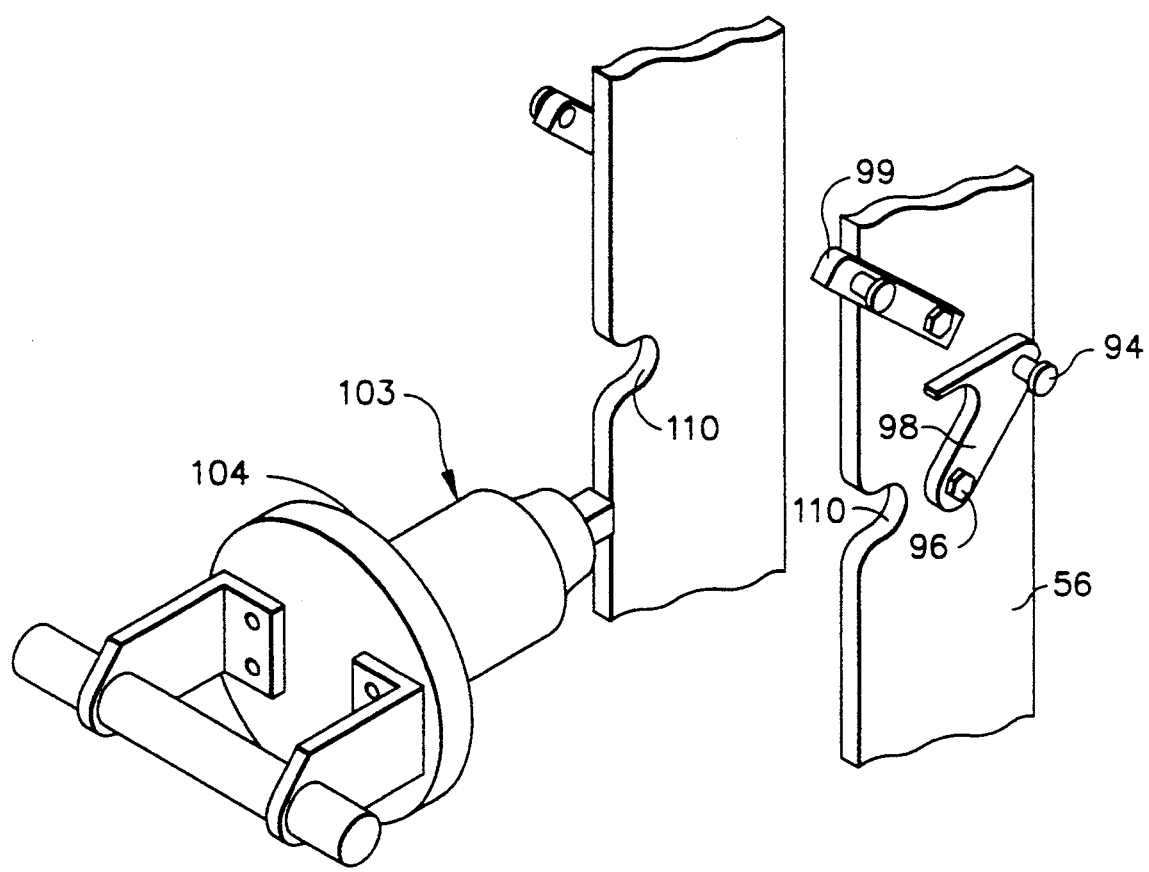
FIGS. 7A and 7B are perspective views showing an air impact motor respectively removed from and installed in the strongback assembly in accordance with a further feature of the invention.
Figure 7B:
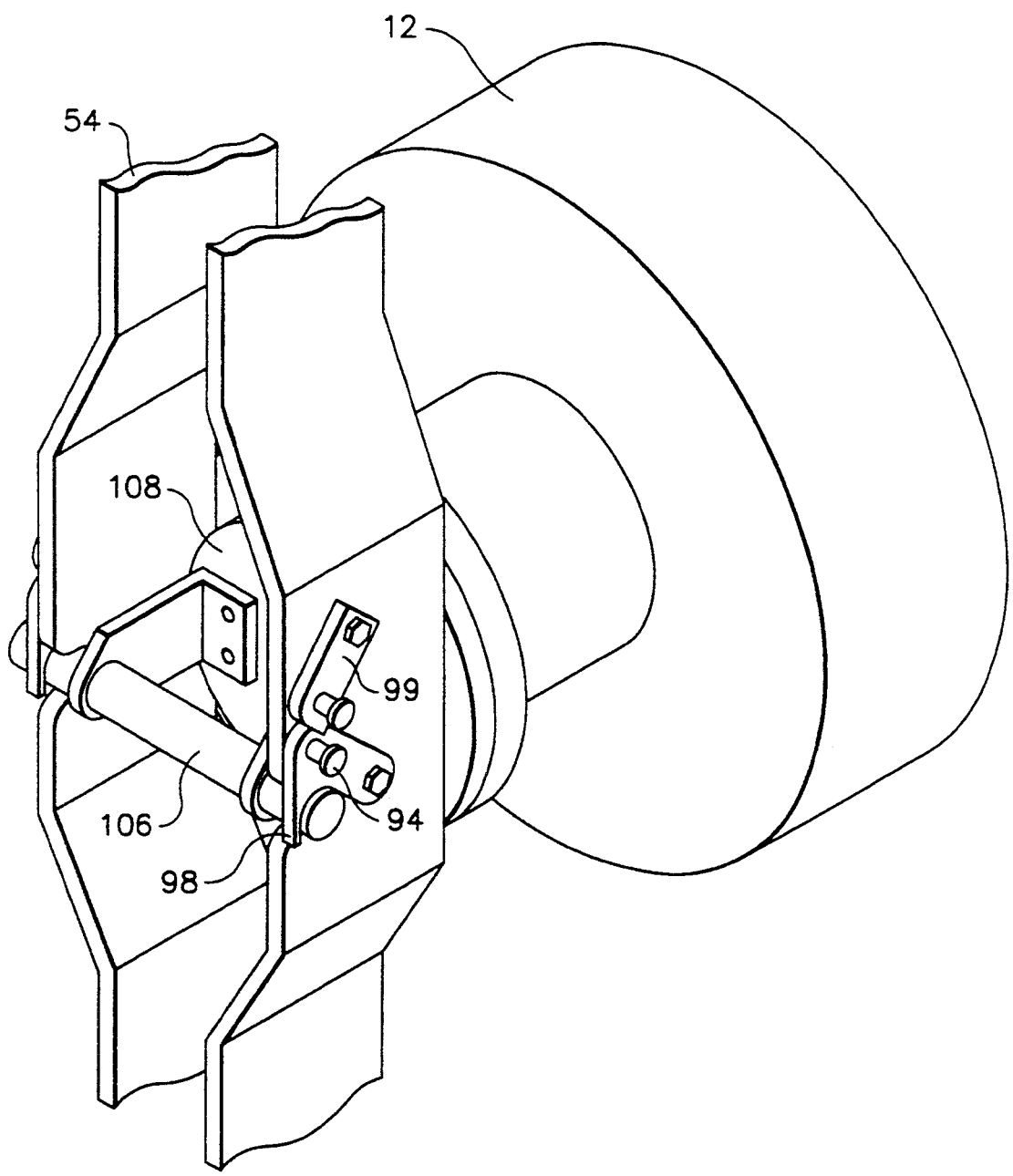

In order to remove the air impact motor 103 from the inflatable seal in the event of motor failure, the installation tool incorporates a remotely operable double latch bar arrangement as shown in FIGS. 7A and 7B. The latch consists of latch handle 94, eccentric bushing 96, latch hook 98 and latch bar 99. Air impact motor 103 has a handle bar 106 which is secured into a pair of notches 110 on the back side of strongback bars 56 and 56'. Hook latches 94 lock over handle bar 106. Then the eccentric bushings 96 are turned to pull on the handle bar by way of the hook latches to firmly securely the air impact motor to the strongback assembly. At the same time, an O-ring compression flange 104 on the air impact motor is compressed onto a mating flange on the inflatable seal assembly, thereby maintaining a watertight seal around the air impact motor. Latch bar 99 prevents latch hook 98 from disengaging due to vibration when operating the air impact motor. The latch handles allow standard actuating poles to be used to pull up the latches and remove a failed air impact motor while the plug is installed underwater. A separate air impact recovery tool (not shown) is used to disengage the steam plug holding grips when the failed motor is pulled out of the way. This feature is advantageous in that the water level in the reactor need not be drained down to the steam nozzle level to main physical access to the plug in the event of air impact motor failure. Thus, there would be minimal impact on the schedule for reactor reassembly which follows removal of the steamline plugs.

When it is time to remove the plug assembly in accordance with the invention, this can be accomplished as follows:

The secondary seal is deflated by turning the inflatable seal valve of control console 76 to the vent position. Also the LLRT/Vent Line valve on control console 76 is turned to the vent position.

The operating lever on the four-way valve is moved to the (R) position and held to release the plug holding grips. Using binoculars or the underwater camera, the operator then verifies that the plug has released the amount of travel by observing that the position indicator rod is in the released travel range. Thereafter, the operator verifies that the steam line has completely backfilled with water by observing that air bubbles have ceased.

Using a rope or service pole with a J-hook, handling bracket 20 is snagged and pulled up to its horizontal position, whereat it engages the holding pawl 21 and is locked in place. A service pole with a 1-inch socket adaptor is lowered onto the hexagonal head 29 of actuating screw 28 and turned counterclockwise to expand the scissors jack assembly 45, thereby retracting plug 12 from steam line nozzle 14.

After plug 12 has been fully retracted, the service pole is removed and the jet pump grapple is lowered and engaged with handling bracket 20. The plug installation tool 10 is slowly raised off of the vessel flange 18 and backed away from the studs 72. Once clear of the studs, the assembly 10 is raised to the surface and transferred to the staging fixture. The operating air lines are then disconnected from the plug assembly, control console and four-way valve. The plug assembly is then decontaminated and stored in a storage container.

The foregoing preferred embodiment has been described for the purpose of illustration only. Various modifications of the steam line plug installation tool in accordance with the invention will be readily apparent to a skilled engineer. The appended claims are intended to encompass all such variations and modifications.

I claim:

1. A plug installation tool for remotely installing a plug in a steam outlet nozzle of a reactor pressure vessel having a flange, comprising:

a strongback assembly on which said plug is securely mounted;

movable support means for supporting said strongback assembly, said movable support means being movable from an extended state to a collapsed state;

rigid tool hanging means for hanging said movable support means from said flange and inside said vessel at an azimuth and an elevation such that said plug is aligned with but not inside said steam line nozzle when said movable support means is in said extended state; and first actuating means coupled to said movable support means such that said movable support means moves between said extended state and said collapsed state in response to manipulation of said first actuating means, whereby said plug is inserted inside said steam line nozzle during movement of said movable support means from said extended state to said collapsed state.

2. The plug installation tool as defined in claim 1, wherein said movable support means comprises a scissors jack mechanism pivotably coupled to a carriage and said first actuating means comprises an actuating screw coupled to said carriage, said scissors jack mechanism moving between said extended state and said collapsed state in response to rotation of said actuating screw.

3. The plug installation tool as defined in claim 2, wherein said strongback assembly comprises notches for receiving a portion of a motor and means for latching said motor portion to said strongback assembly, said latching means being remotely releasable by manipulation of latch handle means connected to said latching means.

4. The plug installation tool as defined in claim 1, further comprising adjustable means for adjusting the elevation of said movable support means relative to said tool hanging means.

5. The plug installation tool as defined in claim 1, further comprising adjustable means for adjusting the elevation of said strongback assembly relative to said movable support means, and second actuating means coupled to said adjustable means such that said adjustable means moves between an extended state and an unextended state in response to manipulation of said second actuating means.

6. The plug installation tool as defined in claim 1, wherein said tool hanging means further comprises azimuth guide means for hanging said plug at a predetermined azimuth relative to said vessel.

7. The plug installation tool as defined in claim 2, wherein said movable support means further comprises an actuating channel coupled to said tool hanging means and a plug support tube coupled to said strongback assembly, and said scissors jack mechanism comprises first and second scissor bars, said first scissors bar being pivotably coupled at one end to said plug support tube and at the other end to said carriage, said second scissors bar being pivotably coupled at one end to a collar slidable along said plug support tube and at the other end to said actuating channel, and said first and second scissors bars being pivotably coupled to each other.

8. The plug installation tool as defined in claim 4, further comprising tool handling means pivotably coupled to said tool hanging means, said tool handling means being rotatable between first and second angular positions, and releasable means for locking said tool handling means in said first angular position.

9. A plug installation tool for remotely installing a plug in a steam outlet nozzle of a reactor pressure vessel having a flange, comprising:
first and second support members;
means for translating said second support member toward said first support member from a first position to a second position;
rigid means for hanging said first support member from said flange and inside said vessel at an azimuth and an elevation such that said plug is aligned with but not inside said steam line nozzle when said second support member is in said first position;
a strongback assembly coupled to said second support member for securely supporting said plug; and
first actuating means coupled to said translating means such that said second support member is translated from said first position to said second position during manipulation of said first actuating means, whereby said plug is inserted in said steam line nozzle during translation of said second support member from said first position to said second position.

10. The plug installation tool as defined in claim 9, wherein said translating means comprises a scissors jack mechanism pivotably coupled to a carriage and said first actuating means comprises an actuating screw coupled to said carriage, said scissors jack mechanism moving from an extended state to a collapsed state in response to rotation of said first actuating screw.

11. The plug installation tool as defined in claim 10, wherein said strongback assembly comprises notches for receiving a portion of a motor and means for latching said motor portion to said strongback assembly, said latching means being remotely releasable by manipulation of latch handle means connected to said latching means.

12. The plug installation tool as defined in claim 9, further comprising adjustable means for adjusting the elevation of said first support member relative to said hanging means.

13. The plug installation tool as defined in claim 9, further comprising adjustable means for adjusting the elevation of said strongback assembly relative to said translating means, and second actuating means coupled to said adjustable means such that said adjustable means moves between an extended state and an unextended state in response to manipulation of said second actuating means.

14. The plug installation tool as defined in claim 9, wherein said hanging means further comprises azimuth guide means for hanging said plug at a predetermined azimuth relative to said vessel.

15. The plug installation tool as defined in claim 10, wherein said first support member comprises an actuating channel and said second support member comprises a plug support tube, and said scissors jack mechanism comprises first and second scissors bars, said first scissors bar being pivotably coupled at one end to said plug support tube and at the other end to said carriage, said second scissors bar being pivotably coupled at one end to a collar slidable along said plug support tube and at the other end to said actuating channel, and said first and second scissors bars being pivotably coupled to each other.

16. The plug installation tool as defined in claim 12, further comprising handling means pivotably coupled to said hanging means, said handling means being rotatable between first and second angular positions, and releasable means for locking said handling means in said first angular position.

17. A plug installation tool comprising:
first and second rigid straight support members;
a hanging bracket assembly coupled to support said first support member and designed to latch onto a top portion of a flange at a top of a reactor pressure vessel in a manner that prevents displacement of said first support member in downward and radially inward directions relative to said reactor pressure vessel;
a collapsible assembly coupled to said first and second support members, said second support member being translated toward said first support member during collapse of said collapsible assembly;
a mounting assembly coupled to said second support member for securely supporting a plug to be translated; and
a first actuating element coupled to said collapsible assembly such that said collapsible assembly collapses in response to manipulation of said first actuating element.

18. The plug installation tool as defined in claim 17, wherein said collapsible assembly comprises a scissors jack mechanism pivotably coupled to a carriage and said first actuating element comprises an actuating screw coupled to said carriage, said scissors jack mechanism moving from an extended state to a collapsed state in response to manipulation of said actuating screw.

19. The plug installation tool as defined in claim 17, further comprising an adjustable arrangement for adjusting the elevation of said mounting assembly relative to said collapsible assembly, and a second actuating element coupled to said adjustable arrangement such that said adjustable arrangement moves between an extended state and an unextended state in response to manipulation of said second actuating element.

20. The plug installation tool as defined in claim 18, wherein said first support member comprises an actuating channel and said second support member comprises a plug support tube, and said scissors jack mechanism comprises first and second scissors bars, said first scissors bar being pivotably coupled at one end to said plug support tube and at the other end to said carriage, said second scissors bar being pivotably coupled at one end to a collar slidable along said plug support tube and at the other end to said actuating channel, and said first and second scissors bars being pivotably coupled to each other.

* * * * *